(12) United States Patent
Daigle

(10) Patent No.: US 6,994,554 B2
(45) Date of Patent: Feb. 7, 2006

(54) PHONOLOGY AND ARTICULATION TOOL

(76) Inventor: Marie A. Daigle, 24 Worthington Rd., Somers, CT (US) 06071

( * ) Notice: Subject to any disclaimer, the term of this patent is extended or adjusted under 35 U.S.C. 154(b) by 54 days.

(21) Appl. No.: 10/773,424

(22) Filed: Feb. 9, 2004

(65) Prior Publication Data
US 2005/0074730 A1   Apr. 7, 2005

Related U.S. Application Data

(60) Provisional application No. 60/464,746, filed on Apr. 24, 2003.

(51) Int. Cl.
*G09B 19/04*   (2006.01)
*A63H 3/36*   (2006.01)

(52) U.S. Cl. .................. 434/185; 434/262; 446/327; 446/328; 446/329; 446/374; 446/375; 446/395

(58) Field of Classification Search .............. 434/263, 434/185, 270, 264; 446/329, 328, 327, 395, 446/374, 373, 378, 379
See application file for complete search history.

(56) References Cited

U.S. PATENT DOCUMENTS

| | | | | |
|---|---|---|---|---|
| 1,667,205 A | * | 4/1928 | Ingwersen | .................. 434/296 |
| 1,850,899 A | | 3/1932 | Smith | |
| 2,574,838 A | | 11/1951 | Olson | |
| 2,711,603 A | * | 6/1955 | Seidl | .......................... 40/416 |
| 2,840,950 A | * | 7/1958 | Julcs | ........................ 446/329 |
| 3,236,006 A | * | 2/1966 | Carroll | ...................... 446/341 |
| 3,447,165 A | * | 6/1969 | Brosk | .............................. 2/75 |
| 3,874,093 A | * | 4/1975 | Garbe | ........................ 434/265 |
| 4,000,579 A | * | 1/1977 | Gornall | ..................... 446/297 |
| 4,073,071 A | | 2/1978 | Angelotti | |
| 4,096,645 A | | 6/1978 | Mandl | |
| 4,263,742 A | * | 4/1981 | Terzian | ...................... 446/340 |
| 4,778,172 A | | 10/1988 | Bryan | |
| 4,871,341 A | | 10/1989 | Sommers | |
| 4,944,710 A | | 7/1990 | Sommers | |
| 5,120,229 A | * | 6/1992 | Moore et al. | ............... 434/263 |
| 5,232,370 A | * | 8/1993 | Hoye | ......................... 434/263 |
| 5,391,106 A | * | 2/1995 | Lidert, Jr. | ................... 446/337 |
| 5,662,477 A | | 9/1997 | Miles | |
| 5,823,847 A | | 10/1998 | Gellman | |

\* cited by examiner

*Primary Examiner*—Dmitry Suhol
(74) *Attorney, Agent, or Firm*—Deborah A. Basile

(57) ABSTRACT

A manipulative tool for demonstrating the relative positions and configurations of articulators and other oral structures, when making phonetic sounds. The tool comprises a tongue, upper and lower palate, and upper and lower teeth, as well as, adjustable and positional lips, any one of which may be manipulated and posed so as to retain placement once released by a user. In this regard, the manipulative tool is used to demonstrate proper formation of certain phonetic sounds to assist in speech therapy or training of persons who are affected by speech impediments, or to assist in the training of future clinicians.

15 Claims, 10 Drawing Sheets

PHONOLOGY AND ARTICULATION TOOL

CROSS REFERENCE TO RELATED APPLICATIONS

This application claims the benefit of U.S. Provisional Application No. 60/464,746 filed on Apr. 24, 2003.

BACKGROUND OF THE INVENTION

1. Field of the Invention

In general, the present invention relates to a manipulative tool to assist in education and training for speech and phonology. More specifically, the invention relates to a manipulative tool used to demonstrate proper positioning and configuration of articulators and other oral structures to improve a client's understanding of phonological rules in general, and to improve his cognitive awareness of the proper positioning and configuration of articulators and other oral structures. Such understanding and awareness will help to improve the client's execution of lingual sounds.

2. Background of the Invention

In general, speech and phonology therapists or clinicians teach clients using charts, diagrams, mirrors, written exercises, recorded sounds, and modeling of correct positioning by the clinician, to convey to the patient the proper formation and positioning of the tongue and lips to make a particular lingual sound. This is a difficult process because it is challenging for a client who has not learned correct sound productions during the normal speech development process to understand the following: (a) the proper articulators to use to produce a specific sound; (b) the proper configuration of the articulators; (c) the proper position in which each articulator must be placed and its relation to the other articulators and to other oral structures; (d) the proper sequence of events that must occur; and (e) the proper timing in which to execute each of the aforementioned movements. To compound this process, many individuals demonstrate neurological involvement which impacts their ability to synchronize the movements of all of the articulators, resulting in errors in timing of which the patient is unaware. Consequently, it is difficult to change a client's wrongfully patterned productions and to create and reinforce new patterns to assist in the elimination of a speech impediment.

A first step in remediating speech impediments is awareness training through auditory modeling wherein the patient learns to perceptually differentiate between correct and incorrect lingual sound productions. The second step is to teach the correct production of the target sound through modeling, pictures, etc., while allowing time to extinguish old habits and create new habits. Throughout this process, the student's performance is measured and evaluated at three levels: the articulatory event, the acoustic event, and the perceptual or auditory event.

In evaluating and measuring the articulatory event, modern medical research, with the help of the latest imaging techniques (e.g., X-ray Cinematography, X-ray kymography, electropalatography ("EPG"), electrokymography, and labiography) have led speech pathologists to adopt new treatment techniques that examine contact points between the tongue and the teeth and the palate. Such treatment techniques encourage the patient to achieve certain contact points for certain sounds and discourage others.

For example, treatment using EPG involves the patient wearing a custom made appliance called a pseudopalate in order to view his "tongue to palate" (lingual palatal) contacts on a computer monitor. A visual display, indicates which areas of the tongue are contacting the four zone areas on the EPG palate, i.e., alveolar, postalveolar, palatal, and velar zones. Using this device, the client learns to manipulate his tongue to match a pattern of the appropriate sensors to touch when producing certain sounds. Thus, a patient would learn how to place his or her tongue in relationship to his or her palate and teeth in order to make a certain sound.

However useful EPG may be, it is difficult and financially expensive to obtain electropalatography instrumentation. Furthermore, during normal speech therapy, wherein the EPG instrumentation is not available, it would be helpful to have an alternative mechanism to demonstrate proper positioning of the articulators relative to each other, and in relation to the other oral structures, based on a particular patient's EPG data.

Rather than utilizing expensive and cumbersome EPG machinery, it would be extremely useful to have a tool that can demonstrate to the client the proper positioning and configuration of the articulators relative to other oral structures; that is, for example, to demonstrate the proper positioning of the tongue or lips relative to each other and to the teeth and upper and lower palate. The use of such a tool would improve a user's awareness of the mechanisms responsible for producing lingual sounds. Increased awareness would result in a greater understanding of the steps essential to learning and producing the target lingual sound.

Thus, there exists a need in the art for the development of an inexpensive tool which may be used to clearly demonstrate: (1) all articulators needed to produce each sound; (2) sufficient teeth and other oral structures to enhance a patient's understanding of the relative positioning of the articulators during each sound production; (3) articulators, i.e., a pair of lips and a tongue, which can be manipulated to show their correct positioning in relation to each other and in relation to other oral structures, i.e., teeth, an upper palate, and a lower palate; (4) an upper palate that can be posed to mimic normal palatal vaulting and its relation to the configuration and position of the articulators; (5) a tongue that can be manipulated and posed to indicate the amount and position of tongue grooving; (6) a tongue that can be manipulated and posed to demonstrate that movement of the tongue tip/blade (front portion of the tongue) can be separated from movement of the tongue dorsum (back portion of the tongue), whereby both areas can move independently of each other (the dorsum can be raised while the tip/blade is lowered); (7) a tongue that can be manipulated and posed along its lateral margins to indicate areas where air should or should not escape; (8) a tongue that can be extended or retracted within the mouth; (9) the amount of contact between the tongue, teeth, and palate; and (10) the location of the contact of the tongue to the teeth and the palate.

SUMMARY OF THE INVENTION

The above problems are eliminated or alleviated by a manipulative tool for demonstrating the relative positions and configurations of articulators and other oral structures, when making phonetic sounds. The tool comprises a tongue, upper and lower palate, and upper and lower teeth, as well as, adjustable and positional lips, all of which may be manipulated and posed so as to retain placement once released by a user. In this regard, the manipulative tool is used to demonstrate proper formation of certain phonetic sounds to assist in speech therapy or training of persons who are affected by speech impediments, or to assist in the training of future clinicians.

DETAILED DESCRIPTION OF THE INVENTION

Disclosed herein is a manipulative tool capable of enhancing speech articulation and pronunciation. More particularly, disclosed herein is a tool capable of improving a user's metalingual understanding by allowing a user to visualize both the placement and configuration of articulators in relation to each other and in relation to other oral structures in order to generate specific lingual sounds. The tool comprises articulators, such as lips and a tongue, and other oral structures, including, for example, an upper and a lower palate, an upper and a lower row of teeth, an alveolar ridge, and the like, all of which may be posed and held into position by a poseable material.

In general, the manipulative tool comprises an exterior region and an interior region, wherein the interior region comprises elements associated with an oral cavity, preferably the oral cavity of a human being. The interior region comprises articulators, such as a pair of lips that also extend to the exterior region, and a tongue. The interior region further comprises other oral structures, including, for example, an upper palate, a lower palate, an alveolar ridge, and teeth. The articulators, as well as the other oral structures, are preferably poseable such that their position and configuration can be altered and held in place without the use of any external support. Such manipulability of the articulators, and of the other oral structures, allows a user to easily visualize the positioning and configuration of each articulator in relation to the other articulators and in relation to the other oral structures, wherein such positioning and configuring is optimal for generating specific lingual sounds. Through visualization of the proper positioning and configuration of these structures, a user can better understand the procedure for generating lingual sounds, wherein such understanding will enhance a user's overall metalingual cognitive development.

The invention is described more fully with reference to the Figures. However, the following detailed description in the accompanying drawings are provided for the purpose of describing presently preferred embodiments of the invention only, and are not intended to describe the only embodiments or forms in which the invention may be practiced. Accordingly, modifications and variations to the manipulative tool are contemplated herein.

Figure 1:
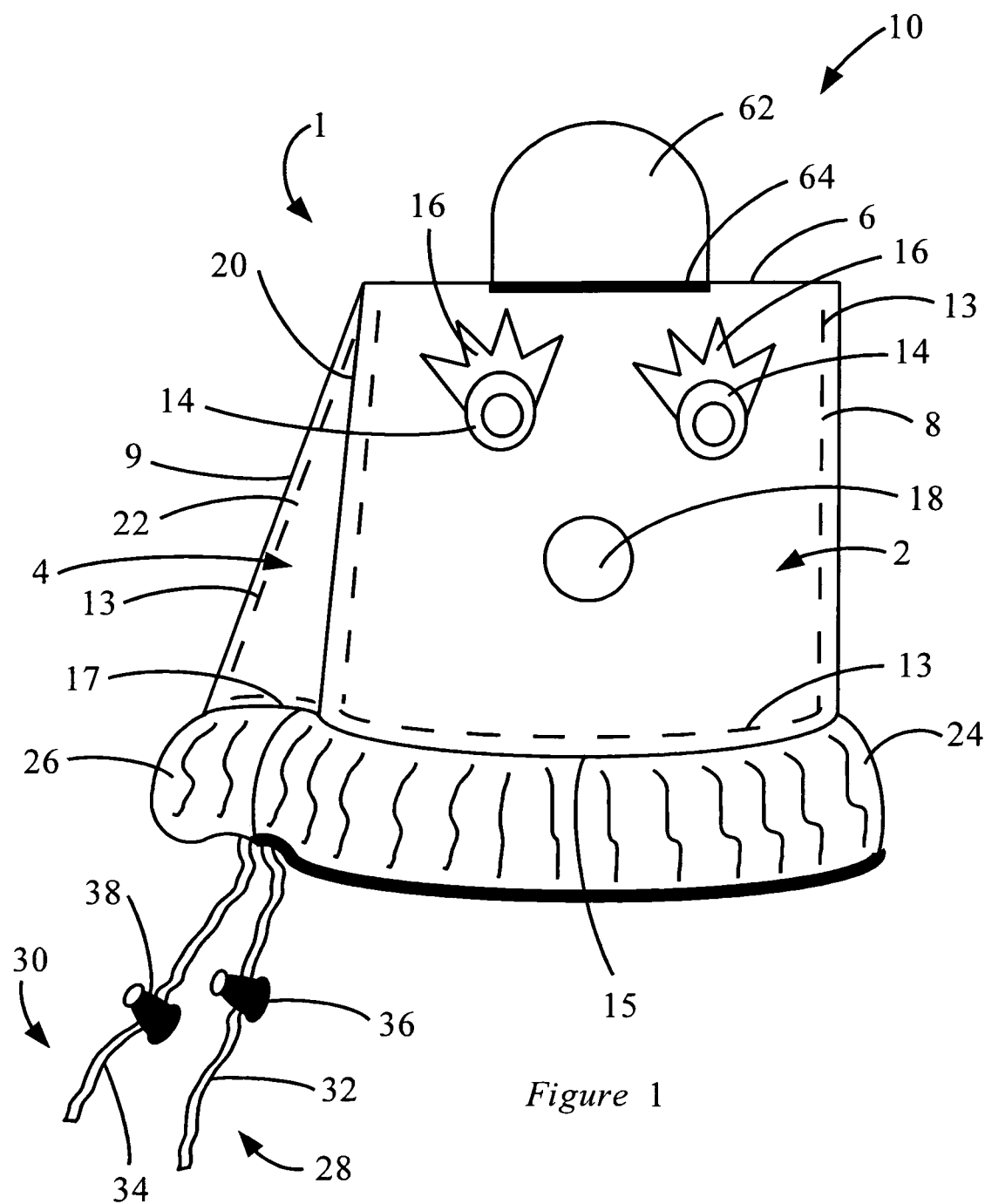
FIG. 1 is a schematic depicting a front perspective view of an exemplary manipulative tool.
Figure 12:
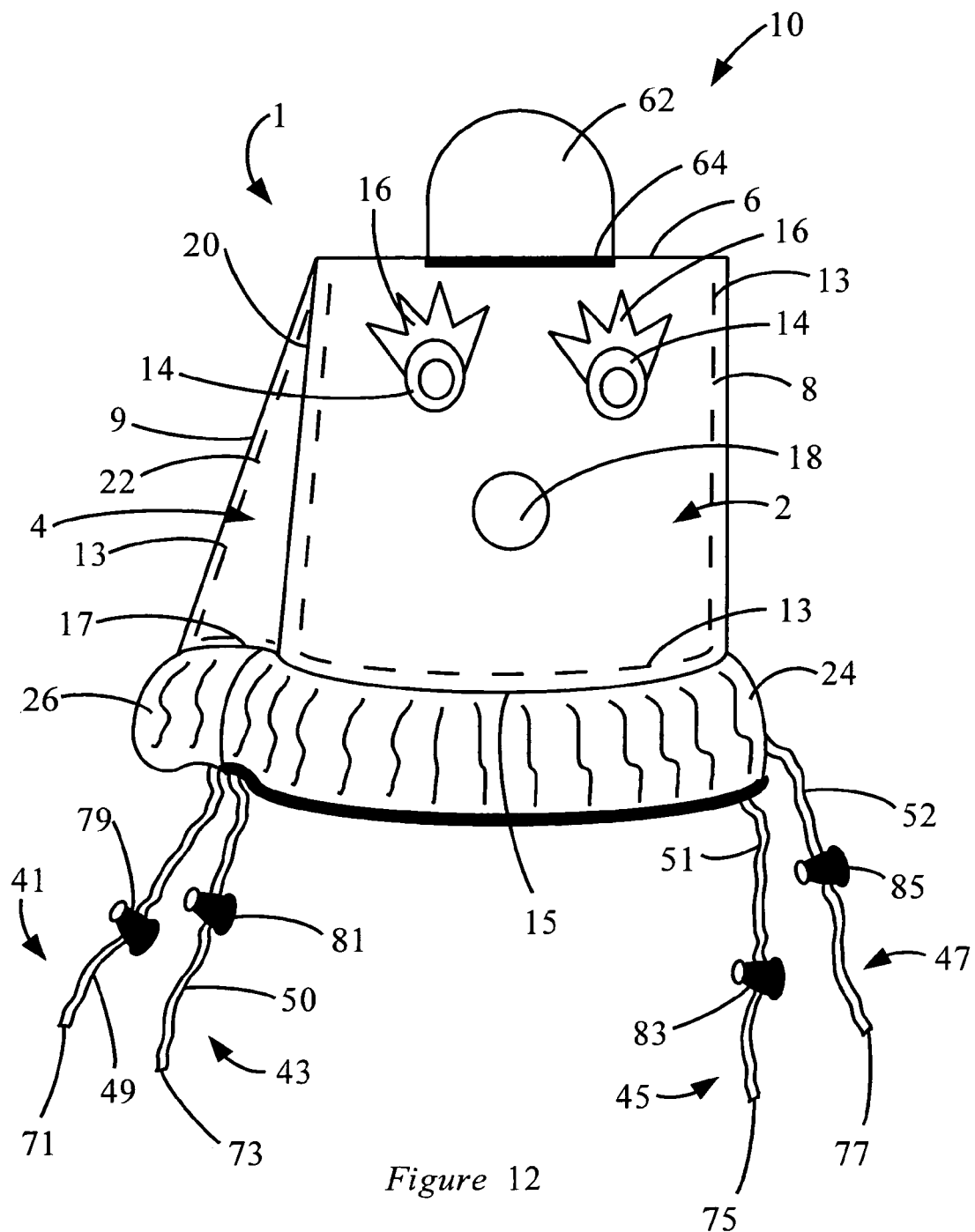
FIG. 12 is a schematic depicting a front perspective view of an exemplary manipulative tool.

FIGS. 1 and 12 depict an exemplary manipulative tool 10 comprising a main member 1 comprising an upper member 2 and a lower member 4. Upper member 2 comprises an upper exterior surface 8 opposite to an upper interior surface 20, and lower member 4 comprises an lower exterior surface 9 opposite to a lower interior surface 22. Upper member 2 is joined to lower member 4 by means of a connecting region 6. Where the joining is continuous, connecting region 6 comprises a fold. Where connecting region 6 is discontinuous, i.e., where upper member 2 is discontinuously joined to lower member 4, such joining may be accomplished by a variety of fastening means, such as, but not limited to, buttons, zippers, snaps, stitching, Velcro™, and the like.

To give manipulative tool 10 a more life-like appearance, in an exemplary embodiment an upper exterior surface 8 on upper member 2 comprises a plurality of indicia, wherein each of the indicia may consists of a feature typically found on the head of a human being, or on the head of any other animate object, either real or fantastic. Exemplary indicia include, for example, a pair of eyes 14, a pair of eyebrows 16, and a nose 18. Each of the indicia may comprise a wide variety of materials including, for example, fabric, plastic, paper, and the like, wherein each of the indicia may comprise the same or different materials as the other indicia. The indicia may be secured to manipulative tool 10 by a wide variety of means, wherein such means may include, for example, stitches, glue, snaps, buttons, Velcro™, and the like, and any combination comprising at least one of the foregoing. Alternatively, the indicia may be drawn, painted, or otherwise applied onto manipulative tool 10.

Manipulative tool 10 further comprises an upper lip 24 and a lower lip 26, wherein upper and lower lips 24, 26 collectively form a mouth. Each of upper and lower lips 24, 26 comprises a front side joined to a back side such that a cavity is formed between the front and back sides.

Additionally, preferably each of upper and lower lips comprises a lip adjustor. Exemplary lip adjustors are depicted in FIG. 1. Referring to FIG. 1, each of upper and lower lips 24, 26 comprises a lip adjustor. Lip adjustors 28, 30 allow a user to manipulate the lips, such that the lips can assume a wide variety of positions, wherein the exact position is dependent upon the desired lingual sound to be generated. For example, lip adjustors 28, 30 can be manipulated to pucker, curl, straighten, etc., corresponding lips 24, 26 in order to instruct a user how the user's lips should be positioned to generate particular lingual sounds. Although the lip adjustors can assume a wide variety of forms and locations, in an exemplary embodiment, lip adjustors 28, 30 each comprises a respective cord 32, 34 disposed within the cavity of each respective lip 24, 26. Cords 32, 34 preferably have a length sufficient to allow for the manipulation of the respective lips. Preferably, cords 32, 34 extend along the entire internal length of lips 24, 26, and extend outwardly from at least one of the lateral sides of the lips 24, 26 such that a user can pull cord(s) 32, 34 to allow the lips to assume various positions. Additionally, lip adjustors 28, 30 preferably each comprise a toggle 36, 38 respectively, wherein toggles 36, 38 assist in securing and adjusting respective cords 32, 34.

In an alternative embodiment, as shown in FIG. 12, manipulative tool 10 may comprise lip adjustors 41, 43, 45, 47 wherein each of lip adjustors 41, 43, 45, 47 comprises a cord 49, 50, 51, 52 respectively. Cords 49, 50, 51, 52 preferably each comprises a first terminal end (not shown) fixed within the cavity of each respective lip 24, 26 and a second terminal end 71, 73, 75, 77 which extends outwardly from one of the lateral sides of the lips 24, 26 such that a user can pull cord(s) 49, 50, 51, 52 to allow the lips to assume various positions. Additionally, lip adjustors 41, 43, 45, 47 may each comprise a toggle 79, 81, 83, 85 respectively, wherein toggles 79, 81, 83, 85 assist in securing and adjusting respective cords 49, 50, 51, 52.

The cords forming the lip adjustors discussed in reference to FIGS. 1 and 12 may comprise a wide range of materials, and may include, for example, rope, string, yarn, plastic, and the like. The toggles may comprises any material that can secure and adjust the cord, and may include, for example, plastic.

Manipulative tool 10 is formed to allow the mouth to open; that is to allow for separation of upper and lower lips 24, 26. The degree to which the mouth can open should be sufficient to allow a user to manipulate the articulators and other oral structures without obstruction, and to allow for the visibility of such articulators and other oral structures after manipulation.

Furthermore, manipulative tool 10 is preferably self-supportable, such that when the mouth is opened, manipulative tool 10 can sustain the open position without the need of any external support. This self-supporting feature can be accomplished through the use of a malleable wire insert, or other poseable material, into main member 1. That is, main member 1 preferably comprises a plush material, such as cotton, silk, rayon, polyester, and the like, and combinations comprising at least one of the foregoing. Preferably upper and lower exterior surfaces 8, 9 are stitched to corresponding upper and lower interior surfaces 20, 22, or otherwise secured thereto, to form upper and lower members 2, 4. Prior to joining the respective exterior and interior surfaces, a malleable wire insert 13 (shown by dashed lines in FIG. 1), or other poseable material, may be inserted between exterior surfaces 8, 9 and corresponding interior surfaces 20, 22. Although wire insert 13 or other poseable material may extend along the entire length and width of at least one of upper and lower members 2, 4, preferably it is disposed along the lateral perimeters of at least one of upper and lower members 2, 4 and along the perimeter of at least one of terminal ends 15, 17 of upper and lower members 2, 4.

Positioning of malleable wire insert 13, or other poseable material, in this manner allows the mouth to stay open without any external support; it further allows a user to shape upper and lower lips 24, 26 such that the lips can assume a wide range of degrees of puckering. For example, lips 24, 26 can be formed into a perfect circle, or can be formed into an oval of varying circumference. Also, the use of a wire insert, or other poseable material, in this fashion allows moveability of the upper and lower palate (to be described later).

Figure 2:
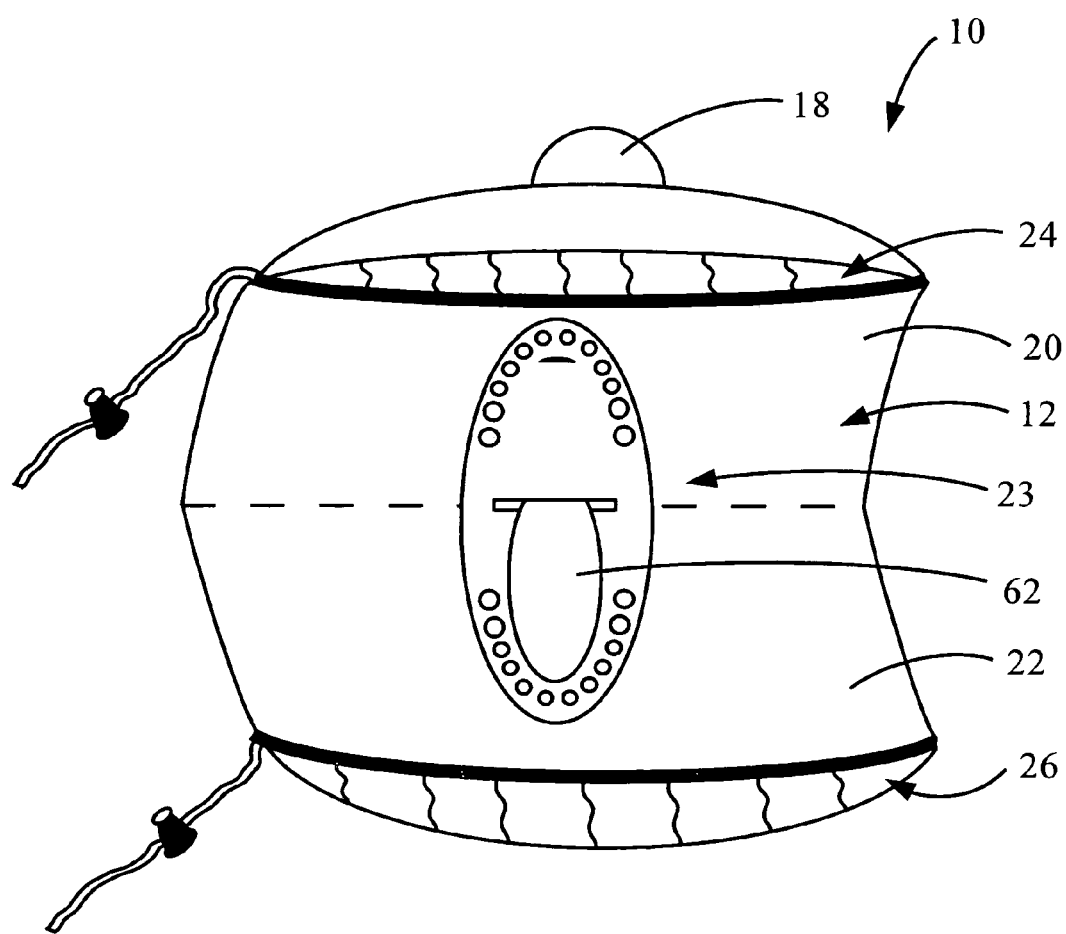
FIG. 2 is a schematic depicting the interior region of the exemplary manipulative tool shown in FIG. 1.

Referring to FIG. 2, when the mouth is opened, i.e., when upper and lower lips 24, 26 respectively are separated from each other, an interior region 12 is exposed. Interior region 12 comprises upper interior surface 20, lower interior surface 22, and an oral cavity member 23, wherein oral cavity member 23 is permanently or detachably disposed onto upper and lower interior surfaces 20, 22.

In an exemplary embodiment, oral cavity member 23 may be continuously formed with upper and lower interior surfaces 20, 22. That is, oral cavity member 23 may be drawn, painted, sewn, or a combination comprising at least one of the foregoing, onto upper and lower interior surfaces 20, 22.

Figures 3, 4:
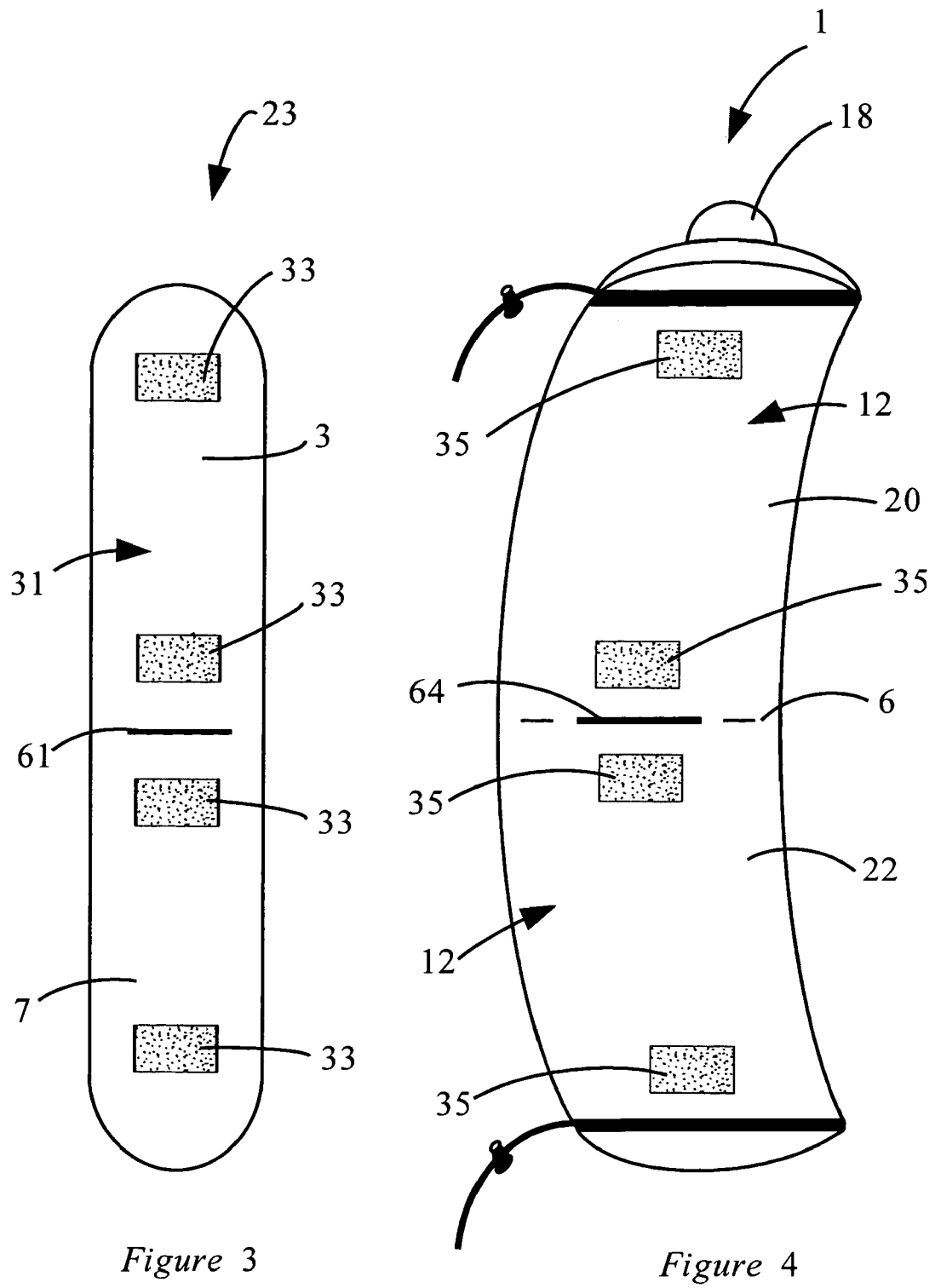
FIG. 3 is a schematic depicting a back side view of an exemplary oral cavity.
FIG. 4 is a schematic depicting an interior view of an exemplary main member.

In another exemplary embodiment, oral cavity member 23 is separable from upper and lower interior surfaces 20, 22 of main member 1. This embodiment is particularly favorable where a closer examination of the oral cavity is desired. This embodiment is described with reference to FIGS. 3 and 4. Referring to FIGS. 3 and 4, a back side 31 of oral cavity 23 may comprise a plurality of fastening means 33, such as Velcro™, that is releasably attachable to a corresponding plurality of fastening means 35, such as Velcro™, on upper and lower interior surfaces 20, 22 of main member 1. Connecting region 6 of main member 1 preferably comprises an opening 64 corresponding to an opening 61 in the region connecting upper and lower portions 3, 7 of oral cavity 23. When assembled, opening 61 is aligned with opening 64 and plurality of fastening means 33 are disposed on top of plurality of fastening means 35, thereby, securing oral cavity 23 onto interior region 12 of main member 1. As discussed later herein, openings 61 and 64 allow for the slideable insertion, securement, and complete removal of a tongue 62.

Oral cavity 23 is further described with reference to FIGS. 2 and 5. The front side of oral cavity member 23 comprises an upper portion 3 preferably having a U-shaped structure. Upper portion 3 comprises an upper row of teeth 40 arranged in a horseshoe shaped fashion along an outer periphery of an upper proximal end 5 of upper portion 3. Upper lateral edges 54, 55 are formed at an upper distal end 21 of the outer periphery of upper portion 3. Similarly, oral cavity member 23 comprises a lower portion 7 having a U-shaped structure. Lower portion 7 comprises a bottom row of teeth 58 arranged in a horseshoe shaped fashion along an outer periphery of a lower proximal end 19 of lower portion 7. Lower lateral edges 56, 57 are formed at a lower distal end 27 of the outer periphery of lower portion 7.

Both upper row of teeth 40 and bottom row of teeth 58 may comprise any number of teeth, wherein the number of teeth is preferably sufficient to demonstrate the extent and the place of tongue 62's contact on the teeth and upper palate when producing target lingual sounds. In a preferred, embodiment, both upper and bottom row of teeth 40, 58 each comprises up to about 14 individual teeth, with up to about 12 individual teeth even more preferred. The teeth are preferably positioned and spaced in relation to each other in the same manner as teeth are positioned and spaced in the mouth of a human being. The teeth may be drawn or painted onto their corresponding upper and lower portions, or they may be applied through various means, such as, for example, by means of stitching, gluing, Velcro™, and the like. In a particularly preferred embodiment, the teeth comprise plastic circular buttons that are sewn onto respective upper and lower portions 3, 7.

Figure 5:
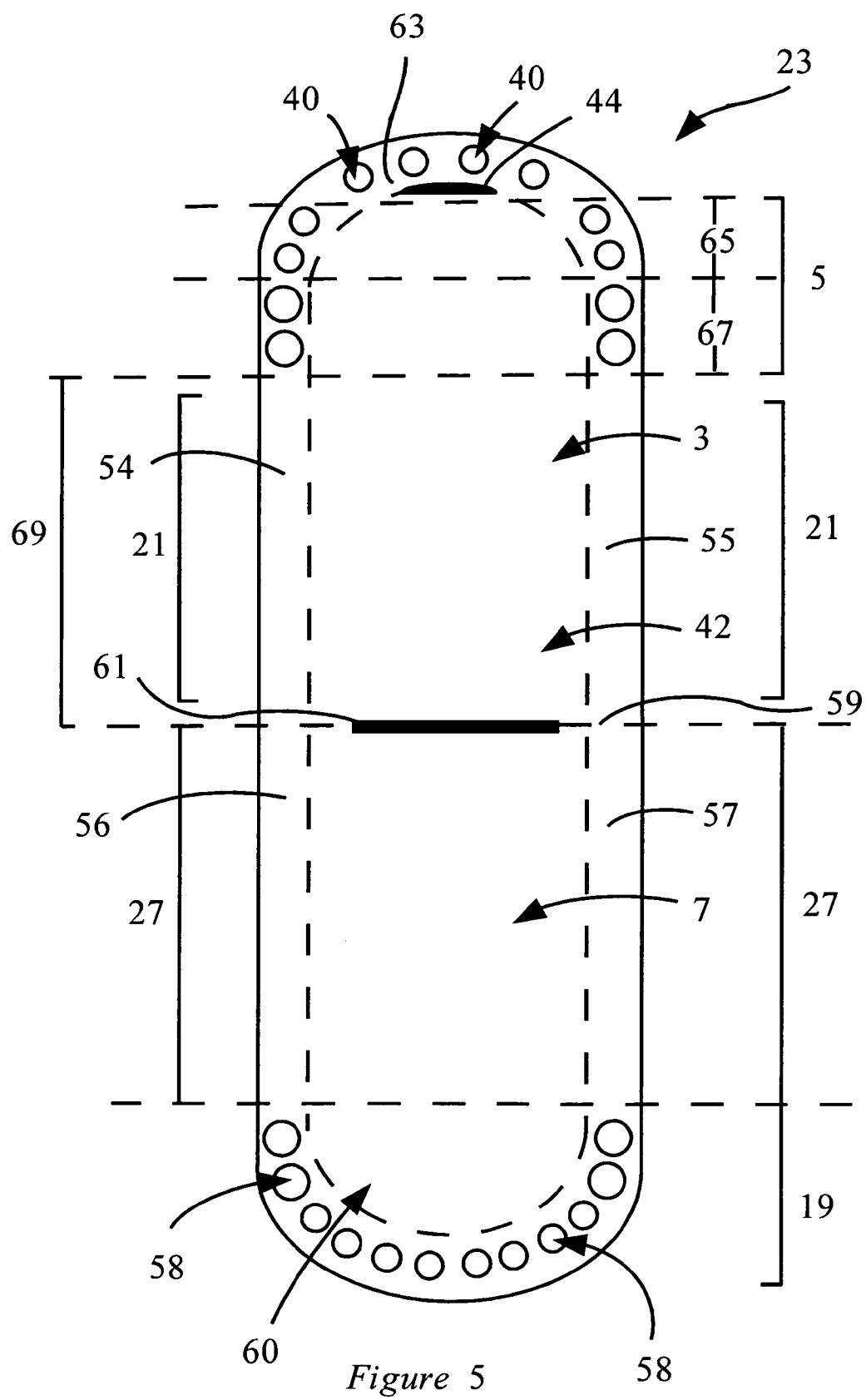
FIG. 5 is a schematic depicting a front side of an exemplary oral cavity.

Still referring to FIGS. 2 and 5, upper portion 3 further comprises an upper palate 42. Upper palate 42 is preferably divided into at least four regions comprising, an alveolar region 63, a post alveolar region 65, a palatal region 67, and a velar region 69. Upper palate 42 further comprises an alveolar ridge 44. Alveolar ridge 44 may comprise a wide variety of materials, and may be drawn, painted, or applied to upper palate 42 by means of stitching, gluing, pasting, Velcro™, and the like. Lower portion 7 further comprises a lower palate 60. Upper palate 42 and lower palate 60 are preferably continuously formed with respective lateral edges 54–57 from a single piece of plush material, such as, cotton, silk, rayon, polyester, and the like, and combinations comprising at least one of the foregoing.

Particularly where oral cavity member 23 is separable from upper and lower interior surfaces 20, 22 of main member 1, upper portion 3 and lower portion 7 may each comprise a poseable material, such as a wire insert, disposed within an interior portion of the plush material forming respective upper and lower portions 3, 7. In this embodiment, the poseable material allows the upper and lower portions 3, 7 to be adjustable and self-supportable such that a user can manipulate the upper and lower portions 3, 7 to resemble the correct human positioning when oral cavity 23 is removed from the manipulative tool. The poseable material may be disposed exclusively within the regions forming lateral edges 54–57, exclusively within the regions forming upper palate 42 and lower palate 60, or may be disposed within all of the regions forming lateral edges 54–57, upper palate 42, and lower palate 60.

Of course, it is to be understood, that where oral cavity 23 is not separable from upper and lower interior surfaces 20, 22 of main member 1, such as where oral cavity 23 is drawn onto main member 1, then the poseable material described immediately above for upper and lower portions 3, 7, may be replaced with the malleable wire insert 13 or other poseable material formed in upper and lower members 2, 4 as previously described with reference to FIG. 1.

Figure 6:
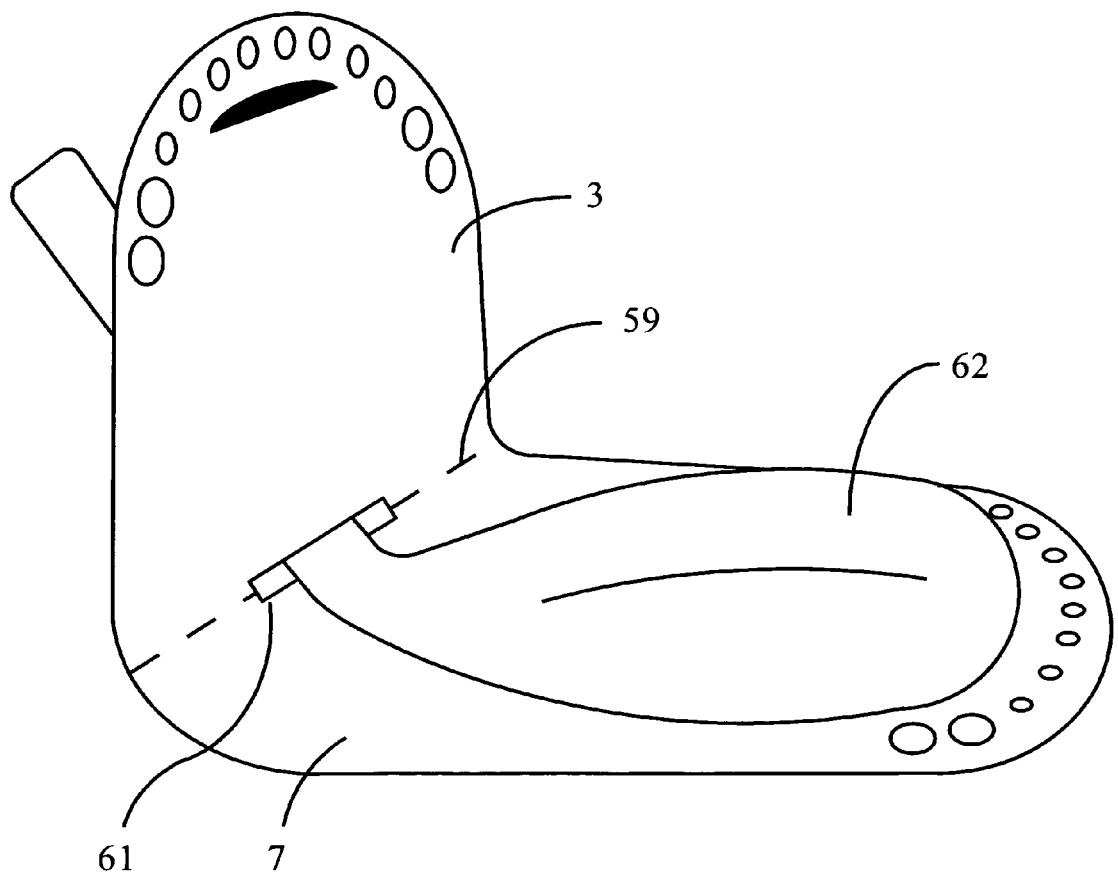
FIG. 6 is a schematic depicting a top view of an exemplary oral cavity including a tongue.

Referring to FIGS. 5 and 6, upper portion 3 is preferably joined, either continuously, i.e., by a bend/fold, or discontinuously, to lower portion 7 by means of a transition element 59. Transition element 59 comprises an opening 61 through which a tongue 62 may be removably and slidably inserted. Opening 61 is preferably dimensioned to allow tongue 62 to slidably engage with oral cavity 23, while simultaneously securing tongue 62 such that tongue 62 does not slip from oral cavity 23. Tongue 62 can move both forward and backward and from side to side.

It is herein noted that where oral cavity 23 is continuous with main member 1, that is, where oral cavity 23, for example, is drawn or painted onto upper and lower interior surfaces 20, 22, or other embodiments wherein opening 61 is not necessary, then tongue 62 may be inserted and secured through opening 64 formed on main member 1. Of course, where, oral cavity 23 is separably discontinuously attached or permanently attached to main member 1, then tongue 62 is preferably inserted through both openings 61 and 64.

Figure 7:
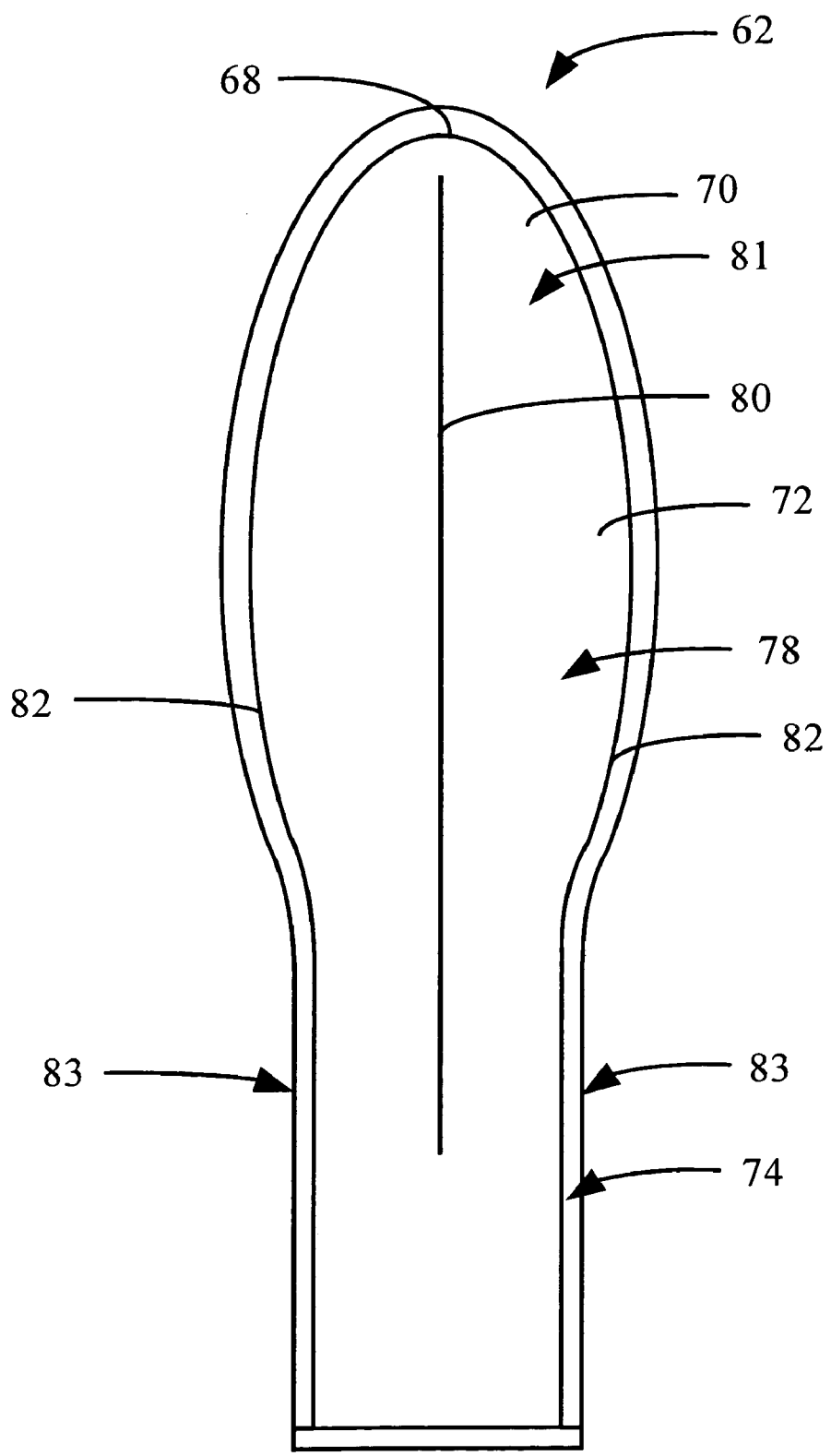
FIG. 7 is a schematic depicting an exemplary tongue.

Tongue 62 is preferably shaped to resemble a human being's tongue. FIG. 7 depicts an exemplary tongue. Here tongue 62 comprises a tip region 68, a blade region 70, and a dorsum region 72. Tongue 62 further comprises a midline 80 which divides a medial surface 78 into equal halves. Tongue 62 further comprises lateral edges 74 which border medial surface 78 and extend along the periphery of tongue 62.

Tongue 62 may be constructed in a wide variety of manners. However, in an exemplary embodiment tongue 62 is formed by inserting a malleable wire insert, or other poseable material, along the outer periphery of tongue 62, i.e., along that part of tongue 62 forming lateral edge 74, such that the malleable wire insert or other poseable material is disposed between materials forming a front side 81 and a back side 83 of tongue 62. Front side 81 may be secured to back side 83 along border 82 to ensure that the wire insert, or other poseable material, does not move out of position. Front side 81 may be secured to back side 83 by a variety of means including, for example, stitching, gluing, pinning, stapling, and the like, wherein stitching is especially preferred. The wire insert allows tongue 62 to be repeatedly flexed and relaxed such that tongue 62 can assume a wide variety of positions over extended periods of use. For example, the wire insert allows tip region 68 to arch downwards (FIG. 8), allows blade region 70 to arch downwards (FIG. 9), allows dorsum region 72 to arch downwards (FIG. 10), and allows tongue 62 to fold upwardly along midline 80. Additionally, the wire insert allows tongue 62 to hold its position without any external or additional supports.

Tongue 62 may comprise a wide variety of materials, wherein a preferred material allows the tongue to maintain its volume during manipulation. Preferred materials include, for example, velvet, velour, or any other like material; or plastics, such as organo silicones, and the like. Additionally, tongue 62 preferably comprises a length and a width sufficient to allow tongue 62 to cover all of upper and lower rows of teeth 40, 58.

The following description provides several examples wherein the manipulative tool disclosed herein can be used to generate specific lingual sounds. By positioning the tongue in the ways described in the Figures, a user can visualize the proper tongue position and configuration for optimally generating specific lingual sounds.

Figure 8:
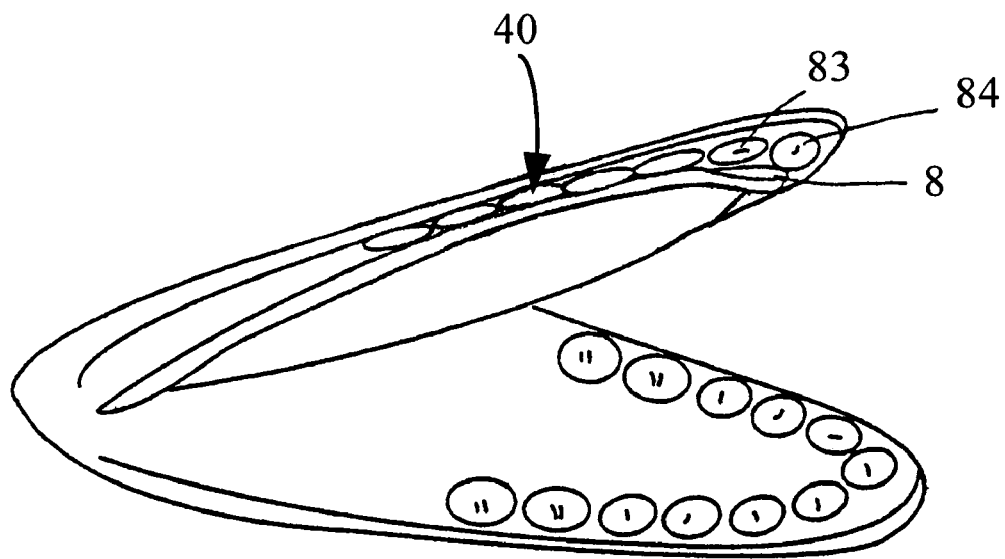
FIGS. 8–11 are schematics depicting an exemplary position and configuration of a tongue.

FIG. 8 depicts the proper tongue position and configuration for generating a "s" sound. Here, tip region 68 arches downward just at two front teeth 83, 84 forming upper row of teeth 40.

Figure 9:
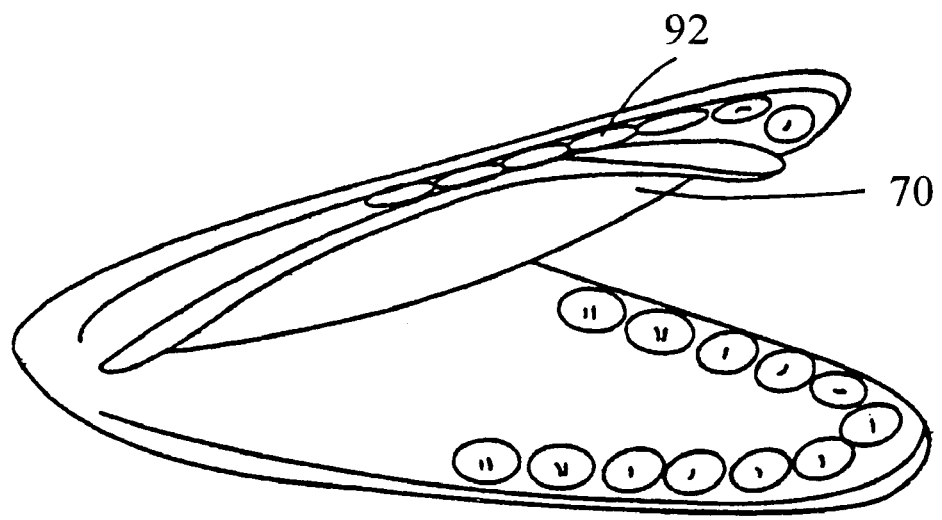

FIG. 9 depicts the proper tongue position and configuration for generating a "sh" sound. Here, blade region 70 arches downward at tooth 92.

Figure 10:
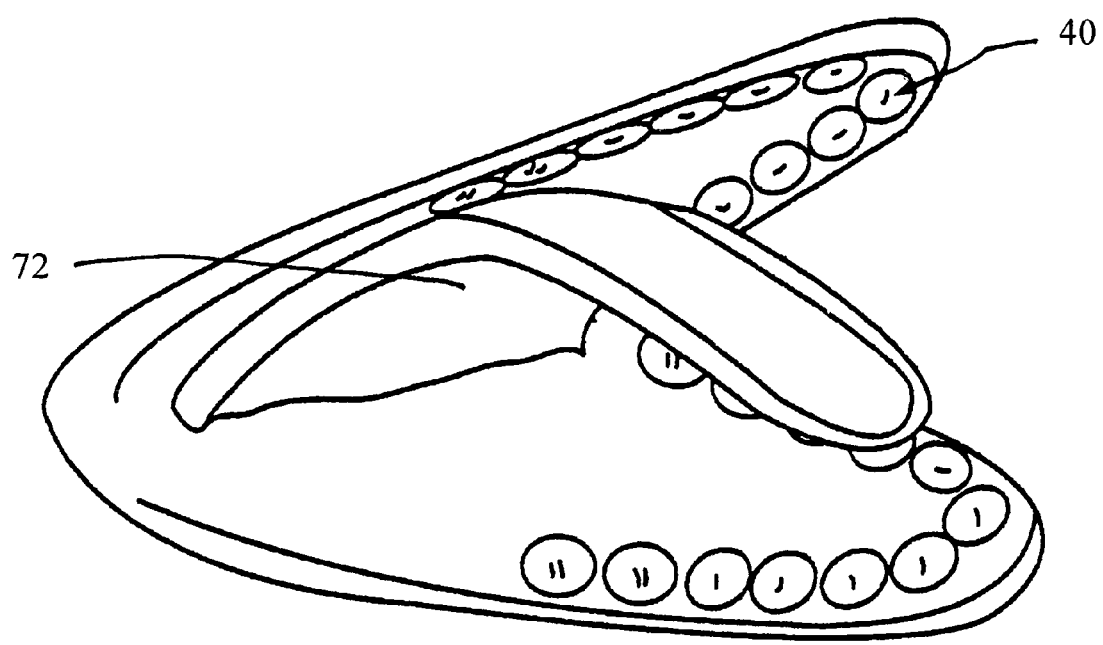

FIG. 10 depicts the proper tongue position and configuration for generating "k", "g", and "ng" sounds. Here, dorsum region 72 arches downwards at the point where dorsum region 72 meets the two furthest back teeth forming upper row of teeth 40.

Figure 11:
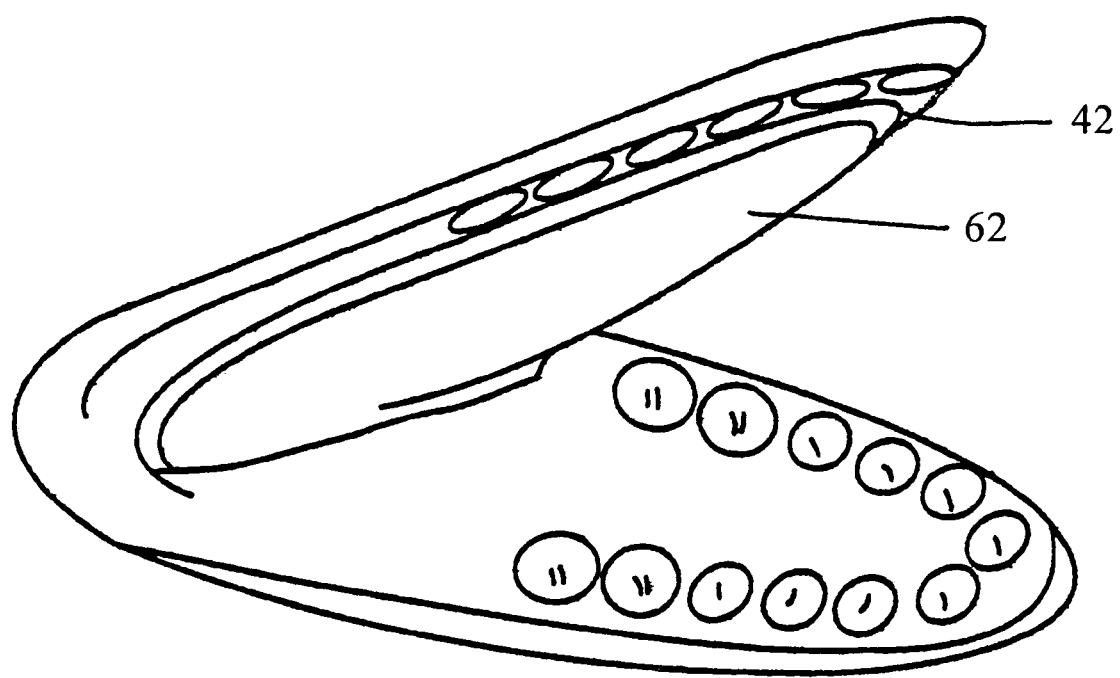

FIG. 11 depicts the proper tongue positioning and configuration for generating "t", "d", and "n" sounds. Here, tongue 62 lies flat against upper palate 42.

The manipulative tool may be used in its preferred embodiment to demonstrate: (1) all articulators necessary to produce sounds; (2) sufficient teeth and an alveolar ridge to allow for the patient's understanding of the relative positioning of the articulators in relation to each other and in relation to other oral structures during each sound production; (3) lips which can be manipulated to show their correct positioning in relation to the movements of the other articulators; (4) an upper palate that can be posed to mimic normal palatal vaulting and its relation to tongue configuration and tongue positioning; (5) a tongue that can be manipulated and posed to indicate amount and position of tongue grooving; (6) a tongue that can be manipulated and posed to demonstrate that movement of the tongue tip/blade regions can be separated from movement of the tongue dorsum region, whereby these regions can move independently of each other (the dorsum can be raised while the tip/blade is lowered); (7) a tongue that can be manipulated and posed along its lateral margins to indicate areas where air should or should not escape; (8) a tongue that can be extended or retracted within the mouth; (9) the amount of contact between the tongue, teeth, and palate; and (10) the location of the contact of the tongue to the teeth and the palate.

The fact that the manipulative tool is poseable and will maintain a particular position for a period of time assists clinicians in demonstrating the proper position and configuration of the articulators, specifically the tongue and lips and their positional relationship to the teeth and palate, to make a specific sound. In addition, when it is necessary to demonstrate the movement or positioning of the tongue for a particular sound, the tongue may be manipulated in every possible direction including: a vertical or horizontal curl, forward and backward extension and retraction, independent movement of the tongue tip/blade from the tongue dorsum, and lifting and lowering of the tongue's lateral margins independent of the tongue's inside area. The tongue may be elevated to be placed adjacent to the upper palate. The tongue may be brought into contact with front upper teeth, front lower teeth or the tongue may come in contact with both lateral teeth simultaneously. Since the upper palate can be manipulated or posed to demonstrate a palatal arch, the tongue, when in contact with the teeth and/or upper palate, will demonstrate the relationship that the palate and tongue have to each other during the sound production.

Furthermore, an important feature of the invention is that the tool may be manipulated and posed to retain a particular position and maintain that position indefinitely without a user's hand or finger having to hold it in a particular position. The prior art shows puppets that can be manipulated to adjust the tongue and mouth with the user's fingers. The user's fingers must be maintained in the identical position in order to support the placement of the tongue or mouth as desired. The present invention is an improvement over such art because the therapist or clinician can position the manipulative tool as needed to teach a particular sound and then remove his or her hand from the tool and address the student or patient without concern for maintaining the proper positioning with his or her fingers or hand.

Also, recent research supports the fact that tongue positioning, including: (1) a range of tongue shapes, (2) a palatal vault, (3) lingual-palatal contact that is demonstrated by multiple place markers along the palate (i.e. alveolar ridge and 12 teeth), (4) a grooving ability to create a tongue palate channel that can be maintained while other movement is executed, (5) a front raising shape to create an occlusion and/or tongue palate channel, (6) a back raising shape to create an occlusion and/or tongue palate channel, as well as, (7) lowering and raising of the lateral tongue margins to stop or divert air flow, are critical to teaching speech and to remediating speech impediments. The manipulative tool disclosed herein assists the practitioner in accomplishing all of these objectives.

Additionally, the manipulative tool disclosed herein allows a clinician to instruct clients utilizing a client's EPG data. This is particularly beneficial as EPG serves as a valuable tool in improving a user's understanding and execution of lingual sounds. However, because in ordinary speech therapy, the use of EPG machinery is unpractical, the manipulative tool allows a clinician to demonstrate the proper positioning and configuration of articulators using data already generated by EPG machinery without further use of such machinery. Therefore, it is simpler and more cost effective for patients, students and speech pathologists in training to use the manipulative tool as disclosed herein to demonstrate the proper relative positioning and configuration of the articulators and other oral structures.

What is claimed is:

1. A manipulative tool comprising:
  a main member comprising:
    an upper exterior surface joined to an upper interior surface to form an upper member, wherein the upper member comprises a first upper proximal end joined to a first upper distal end;
    a lower exterior surface joined to a lower interior surface to form a lower member, wherein the lower member comprises a first lower proximal end joined to a first lower distal end; and
    a connecting region wherein the connecting region joins the first upper distal end to the first lower distal end, wherein the connecting region comprises a first opening; and
  a tongue comprising:
    a front side joined to a back side;
    a poseable material disposed between the front and back sides;
    wherein the tongue is disposed within the first opening;
    an upper lip joined to the first upper proximal end of the upper member; and
    a lower lip joined to the first lower proximal end of the lower member;
  wherein the upper and lower lip each comprises a front side joined to a back side such that a cavity is formed between the front and back sides, and further wherein at least one of the upper and lower lips comprises:
    a lip adjustor disposed on at least one of the respective upper lip and lower lip for changing a configuration of the respective upper lip and lower lip, the lip adjustor(s) comprises:
      a first cord disposed along a length of the cavity of the respective lip, wherein the first cord comprises:
        a first terminal end secured to a first point in the cavity of the respective lip; and
        a second terminal end extending outwardly from the cavity of the respective lip;
      a first toggle disposed on a portion of the first cord extending outwardly away from the cavity of the respective tip;
      a second cord disposed along the length of the cavity of the respective lip, wherein the second cord comprises:
        a first terminal end secured to a second point in the cavity of the respective lip; and
        a second terminal end extending outwardly from the cavity of the respective lip; and
      a second toggle disposed on a portion of the second cord extending outwardly away from the cavity of the respective lip.

2. The manipulative tool of claim 1, wherein at least one of the upper member and the lower member comprises a poseable material disposed between the respective upper exterior and upper interior surfaces and between the lower exterior and lower interior surfaces such that the main member is poseable.

3. The manipulative tool of claim 1, wherein the manipulative tool further comprises a pair of eyes, a pair of eyebrows, a nose, or a combination comprising at least one of the foregoing disposed on the upper exterior surface.

4. The manipulative tool of claim 1, wherein the connecting region is a fold that continuously joins the upper member to the lower member.

5. The manipulative tool of claim 1, wherein the tongue is slideably and removably engaged with the first opening.

6. The manipulative tool of claim 1, further comprising an oral cavity comprising:
  an upper portion disposed on the upper interior surface of the upper member;
  an upper row of teeth disposed on a surface of the upper portion opposite to the upper member;
  a lower portion disposed on the lower interior surface of the lower member; and
  a lower row of teeth disposed on a surface of the lower portion opposite to the lower member.

7. The manipulative tool of claim 6 wherein the oral cavity further comprises an alveolar ridge disposed on the surface of the upper portion.

8. The manipulative tool of claim 6, wherein at least one of the upper portion and the lower portion comprises a poseable material.

9. A manipulative tool comprising:
  a main member comprising:
    an upper exterior surface joined to an upper interior surface to form an upper member, wherein the upper member comprises a first upper proximal end joined to a first upper distal end;

a lower exterior surface joined to a lower interior surface to form a lower member, wherein the lower member comprises a first lower proximal end joined to a first lower distal end; and a connecting region wherein the connecting region joins the first upper distal end to the first lower distal end, wherein the connecting region comprises a first opening;

a tongue comprising:

a front side joined to a back side; and a poseable material disposed between the front and back sides;

wherein the tongue is disposed within the first opening; and an oral cavity comprising:

an upper portion disposed on the upper interior surface of the upper member, wherein the upper portion comprises a back side joined to a front side to form a U-shaped structure, wherein the U-shaped structure comprises:

a concave end forming a second upper proximal end; and a planar end forming a second upper distal end;

wherein the second upper proximal end is joined to the second upper distal end;

an upper row or teeth disposed on a surface of the upper portion opposite to the upper member;

a lower portion disposed on the lower interior surface of the lower member, wherein the lower portion comprises a back side joined to a front side to form a U-shaped structure, wherein the U-shaped structure comprises:

a concave end forming a second lower proximal end; and a planar end forming a second lower distal end;

wherein the second lower proximal end is joined to the second lower distal end;

a lower row of teeth disposed on a surface of the lower portion opposite to the lower member; and a transition element joining the second upper distal end to the second lower distal end, wherein the transition element comprises a second opening aligned with the first opening of the connecting region of the main member.

10. The manipulative tool of claim 9, wherein the tongue is slideably and removably engageable with the first and second openings.

11. The manipulative tool of claim 9, wherein at least one of the back sides of the upper portion and the lower portion of the oral cavity comprises a fastening means compatible with a fastening means located on the respective upper interior surface and lower interior surface of the main member, whereby the oral cavity is secured to the main member.

12. The manipulative tool of claim 11, wherein the oral cavity is removable from the main member.

13. A manipulative tool comprising:

a main member comprising:

an upper exterior surface joined to an upper interior surface to form an upper member, wherein the upper member comprises an upper proximal end joined to an upper distal end;

a lower exterior surface joined to a lower interior surface to form a lower member, wherein the lower member comprises a lower proximal end joined to a lower distal end; and a connecting region wherein the connecting region joins the upper distal end to the lower distal end;

an upper lip joined to the upper proximal end of the upper member;

a lower lip joined to the lower proximal end of the lower member;

wherein the upper and lower lip each comprises a front side joined to a back side such that a cavity is formed between the front and back sides, and further wherein at least one of the upper and lower lips comprises a lip adjustor for changing a configuration of the respective upper lip and lower lip, wherein the lip adjustor comprises:

a first cord disposed along a length of the cavity of the respective lip, wherein the first cord comprises:

a first terminal end secured to a first point in the cavity of the respective lip; and a second terminal end extending outwardly from the cavity of the respective lip;

a first toggle disposed on a portion of the first cord extending outwardly away from the cavity of the respective lip;

a second cord disposed along the length of the cavity of the respective lip, wherein the second cord comprises:

a first terminal end secured to a second point in the cavity of the respective lip; and a second terminal end extending outwardly from the cavity of the respective lip; and a second toggle disposed on a portion of the second cord extending outwardly away from the cavity of the respective lip.

14. The manipulative tool of claim 13, wherein the connecting region comprises an opening that extends through an exterior and an interior surface of the connecting region, and further wherein the manipulative tool comprises:

a tongue, wherein the tongue extends from the exterior surface into the interior surface of the connecting region.

15. The manipulative tool of claim 13, wherein at least one of the upper member and lower member comprises a poseable material disposed between the respective upper exterior and upper interior surfaces and between the lower exterior and lower interior surfaces.

* * * * *